US009485304B2

(12) United States Patent
Kent et al.

(10) Patent No.: US 9,485,304 B2
(45) Date of Patent: Nov. 1, 2016

(54) ASSET STREAMING AND DELIVERY

(71) Applicant: Numecent Holdings, Inc., Irvine, CA (US)

(72) Inventors: Osman Kent, Chertsey Surrey (GB); Arthur S. Hitomi, Huntington Beach, CA (US)

(73) Assignee: Numecent Holdings, Inc., Irvine, CA (US)

(*) Notice: Subject to any disclaimer, the term of this patent is extended or adjusted under 35 U.S.C. 154(b) by 305 days.

(21) Appl. No.: 13/874,433

(22) Filed: Apr. 30, 2013

(65) Prior Publication Data

US 2013/0318211 A1  Nov. 28, 2013

Related U.S. Application Data

(60) Provisional application No. 61/754,459, filed on Jan. 18, 2013, provisional application No. 61/640,466, filed on Apr. 30, 2012.

(51) Int. Cl.
*G06F 15/16* (2006.01)
*H04L 29/08* (2006.01)
*H04M 1/725* (2006.01)

(52) U.S. Cl.
CPC .......... *H04L 67/10* (2013.01); *H04M 1/72525* (2013.01)

(58) Field of Classification Search
CPC ........................................................ H04L 67/10
USPC ......................................................... 709/219
See application file for complete search history.

(56) References Cited

U.S. PATENT DOCUMENTS

| 5,860,012 | A   | 1/1999  | Luu             |         |
|-----------|-----|---------|-----------------|---------|
| 6,324,690 | B1  | 11/2001 | Luu             |         |
| 6,343,313 | B1  | 1/2002  | Salesky et al.  |         |
| 6,886,169 | B2  | 4/2005  | Wei             |         |
| 6,917,963 | B1  | 7/2005  | Hipp et al.     |         |
| 6,944,858 | B2  | 9/2005  | Luu             |         |
| 7,210,147 | B1  | 4/2007  | Hipp et al.     |         |
| 7,240,162 | B2* | 7/2007  | de Vries        | 711/137 |
| 7,522,664 | B1  | 4/2009  | Bhaskar et al.  |         |
| 7,577,751 | B2  | 8/2009  | Vinson et al.   |         |
| 7,720,864 | B1  | 5/2010  | Muth et al.     |         |

(Continued)

OTHER PUBLICATIONS

Ahlund, "An Approach Toward User-Centric Application Mobility," Master's Thesis in Computing Science, Umea University, Umea, Sweden, Aug. 28, 2009 [retrieved online at http://www8.cs.umu.se/education/examina/Rapporter/AndreasAhlund.pdf on Apr. 22, 2013].

(Continued)

*Primary Examiner* — Glenford Madamba
(74) *Attorney, Agent, or Firm* — Sheppard, Mullin, Richter & Hampton LLP

(57) ABSTRACT

Streaming assets to an asset streaming client is described. An asset streaming system is configured to generate a request to retrieve at least a portion of an asset. The asset streaming system is part of an asset streaming client and integrated in an operating system abstraction level with the operating system or in an abstraction level beneath the operating system abstraction level. An asset provider system can receive the request that is generated by the asset streaming system and provide the portion of the asset to the asset streaming system. The asset streaming client can then exploit the portion of the asset.

14 Claims, 9 Drawing Sheets

(56) References Cited

U.S. PATENT DOCUMENTS

| | | | |
|---|---|---|---|
| 7,958,200 | B2 | 6/2011 | McFadden et al. |
| 8,117,600 | B1 | 2/2012 | Roeck et al. |
| 8,645,946 | B2 | 2/2014 | Wookey |
| 8,667,482 | B2 | 3/2014 | Bernardi |
| 8,712,959 | B1 | 4/2014 | Lim et al. |
| 8,768,800 | B2 | 7/2014 | Milosavljevic et al. |
| 2001/0034736 | A1* | 10/2001 | Eylon et al. ............... 707/200 |
| 2003/0004882 | A1* | 1/2003 | Holler et al. ................ 705/51 |
| 2003/0140089 | A1 | 7/2003 | Hines et al. |
| 2003/0226138 | A1 | 12/2003 | Luu |
| 2004/0024845 | A1 | 2/2004 | Fishhaut et al. |
| 2005/0198647 | A1 | 9/2005 | Hipp et al. |
| 2006/0083308 | A1 | 4/2006 | Schwarz et al. |
| 2006/0122937 | A1 | 6/2006 | Gatto et al. |
| 2007/0083645 | A1 | 4/2007 | Roeck et al. |
| 2007/0254742 | A1 | 11/2007 | O'Brien |
| 2008/0005349 | A1 | 1/2008 | Li et al. |
| 2008/0120129 | A1 | 5/2008 | Seubert et al. |
| 2008/0163202 | A1 | 7/2008 | Kembel et al. |
| 2008/0165280 | A1 | 7/2008 | Deever et al. |
| 2008/0222659 | A1* | 9/2008 | Brumme et al. ............ 719/320 |
| 2008/0228865 | A1 | 9/2008 | Cruzada |
| 2008/0301280 | A1 | 12/2008 | Chasen et al. |
| 2009/0109213 | A1 | 4/2009 | Hamilton, II |
| 2009/0158311 | A1 | 6/2009 | Hon et al. |
| 2009/0203368 | A1 | 8/2009 | Marsyla et al. |
| 2009/0204711 | A1 | 8/2009 | Binyamin et al. |
| 2010/0070526 | A1 | 3/2010 | Matias |
| 2010/0138475 | A1 | 6/2010 | Frank et al. |
| 2010/0235112 | A1 | 9/2010 | Kesler et al. |
| 2010/0235153 | A1 | 9/2010 | Sharp et al. |
| 2010/0250670 | A1 | 9/2010 | Wei |
| 2010/0333085 | A1 | 12/2010 | Criddle et al. |
| 2011/0063500 | A1 | 3/2011 | Loher et al. |
| 2011/0066570 | A1 | 3/2011 | Kolo et al. |
| 2012/0066286 | A1* | 3/2012 | Heredia ............ H04L 41/0806 709/201 |
| 2012/0110131 | A1 | 5/2012 | Villagas Nunez et al. |
| 2012/0144386 | A1 | 6/2012 | Wookey |
| 2012/0278439 | A1 | 11/2012 | Ahiska |
| 2012/0297311 | A1 | 11/2012 | Duggal |
| 2013/0007227 | A1 | 1/2013 | Hitomi et al. |
| 2013/0045759 | A1 | 2/2013 | Smith |
| 2013/0073775 | A1 | 3/2013 | Wade et al. |
| 2014/0068022 | A1 | 3/2014 | Kshirsagar et al. |
| 2014/0136601 | A1 | 5/2014 | Kent et al. |
| 2014/0169471 | A1 | 6/2014 | He |

OTHER PUBLICATIONS

International Application No. PCT/US2013/022295, International Search Report and Written Opinion mailed Apr. 15, 2013.

International Application No. PCT/US2013/059316, International Search Report and Written Opinion mailed Mar. 20, 2014.

* cited by examiner

ASSET STREAMING AND DELIVERY

CROSS-REFERENCE TO RELATED APPLICATIONS

This application claims priority to U.S. Provisional Patent Application No. 61/754,459 entitled ASSET STREAMING AND DELIVERY SYSTEM FOR CONNECTED DEVICES, filed Jan. 18, 2013 and U.S. Provisional Patent Application No. 61/640,466 entitled APPLICATION DELIVERY, filed Apr. 30, 2012, both of which are incorporated herein by reference.

BACKGROUND

As devices become more mobile and smaller and as wireless data transmission technology advances, industries have looked for ways in which such devices can function with newly developed applications and programs while still being small and mobile. As applications and programs continue to evolve they become larger in size and consume more resources. Physical memory space is critical in dictating the size and mobility of devices. An area of ongoing research and development is producing smaller devices that can handle larger programs.

SUMMARY

The following implementations and aspects thereof are described and illustrated in conjunction with systems, tools, and methods that are meant to be exemplary and illustrative, not necessarily limiting in scope. In various embodiments, one or more of the above-described problems have been addressed, while other embodiments are directed to other improvements.

Various implementation enable computer-based devices, particularly those that heavily rely on network connectivity to perform their functionality (e.g., such "connected devices," as smart phones and tablets), to seamlessly store assets to and retrieve assets from a cloud-based storage while using demand-paging. For a given computer-based device, some implementations can virtualize the local storage of the computer-based device on the cloud and couple the computer-based device to the virtualized local storage such that virtualized local storage appears as resident storage on the computer-based device.

The foregoing examples of the related art and limitations related therewith are intended to be illustrative and not exclusive. For example, wireless clients may use different protocols other than WiFi (or IEEE 802.11), potentially including protocols that have not yet been developed. However, problems associated with performance may persist. Other limitations of the relevant art will become apparent to those of skill in the art upon a reading of the specification and a study of the drawings.

DETAILED DESCRIPTION

Figure 1:
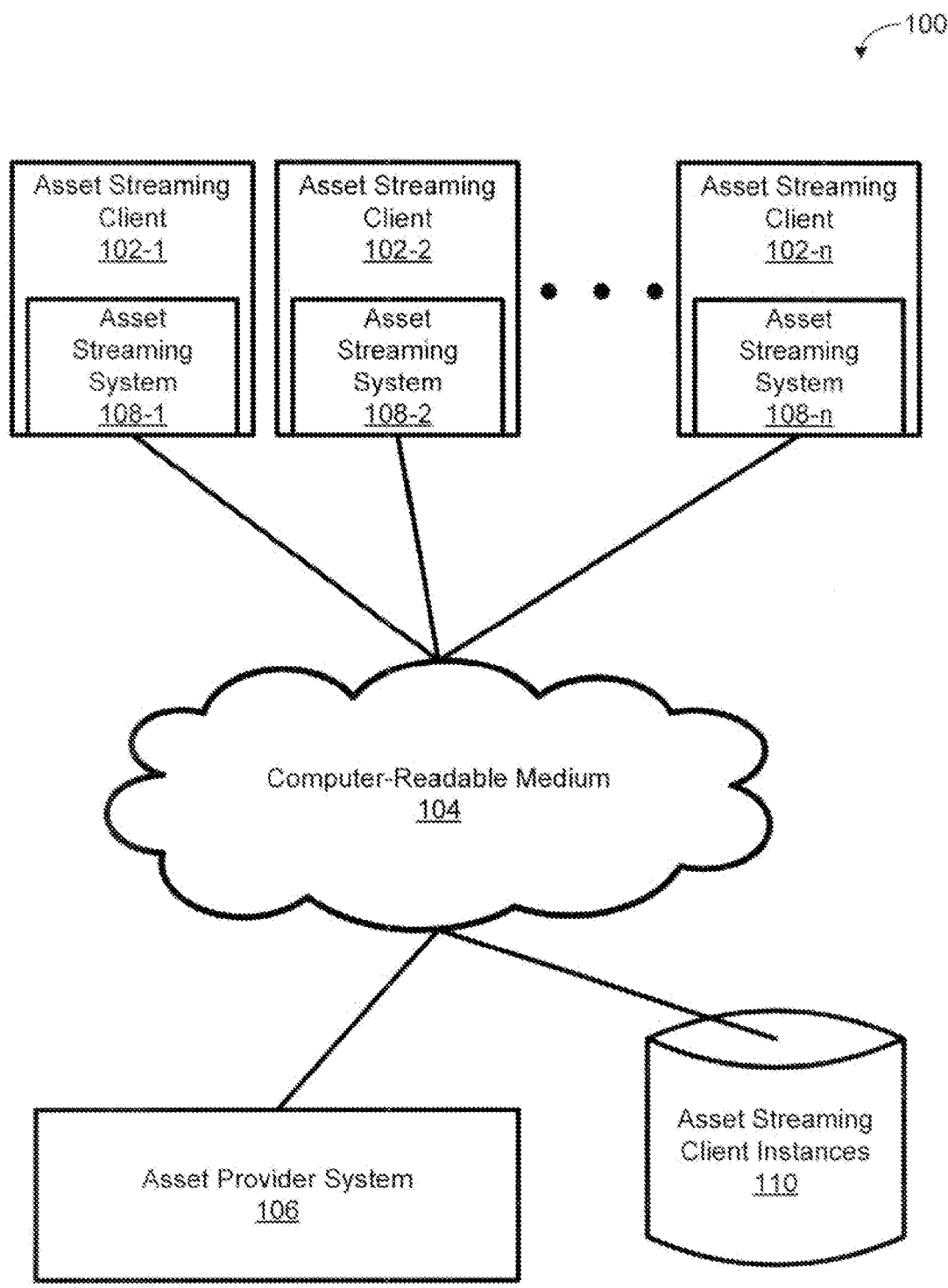
FIG. 1 depicts a diagram of an example of an asset streaming system.

FIG. 1 depicts a diagram 100 of an example of an asset streaming system. In the example of FIG. 1, the diagram 100 includes asset streaming clients 102-1 to 102-n (collectively referred to as "asset streaming clients 102"), a computer-readable medium 104, an asset provider system 106 and an asset streaming client instances datastore 110. As used in this paper, a system can be implemented as an engine or a plurality of engines. An engine, as used in this paper, includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor.

One or more of the engines that are part of the systems described in this paper can be cloud-based engines. A cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, the term "computer-readable medium" is intended to include physical media, such as a network, memory or a computer bus. Accordingly, in some instances, the computer-readable medium can permit two or more computer-based components to communicate with each other. For example, as shown in FIG. 1, the computer-readable medium 104 can be a network, which can couple together the asset streaming clients 102, the asset provider system 106 and the asset streaming client instances datastore 110. Through the computer-readable medium 104, the asset streaming clients 102, the asset provider system 106 and the asset streaming client instances datastore 110 can communicate data between one another.

As a network, the computer-readable medium 104 may be practically any type of communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). For example, the computer-readable medium 104 can include one or more wide area networks (WANs), metropolitan area networks (MANs), campus area networks (CANs), or local area networks (LANs); theoretically, the computer-readable medium 104 could be a network of any size or characterized in some other fashion. Networks can include enterprise private networks and virtual private networks (collectively, "private networks"). As the name suggests, private networks are under the control of a single entity. Private networks can include a head office and optional regional offices (collectively, "offices"). Many offices enable remote users to connect to the private network offices via some other network, such as the Internet. The example of FIG. 1 is intended to illustrate a computer-readable medium 104 that may or may not include more than one private network.

As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 1, the asset provider system 106 is coupled to the asset streaming clients 102 through the computer-readable medium 104. The asset provider system 106 provides the asset streaming clients 102 with data (e.g., portions of a stream-enabled asset) that enables the asset streaming clients 102 to exploit the stream-enabled asset.

Likewise, unless stated otherwise, a "client" as used in this paper includes at least a portion of a computer system running client software. Similarly, unless stated otherwise or content dictates otherwise, the computer-readable medium 104 and any other systems described in this paper include at least a portion of a computer system.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that can include a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The asset streaming clients 102, the computer readable medium 104, the asset provider system 106 and any systems described in this paper can be compatible with or implemented through a cloud-based computing system. As used in this paper, a cloud-based computing system is a system that provides virtualized computing resources, software and/or information to client devices. "Cloud" may be a marketing term and for the purposes of this paper can include any of the networks described herein.

As used herein, an "asset" can be content accessed or generated by a computer-based process. As way of example, an asset can include applications, such as games, document-based applications (e.g., word processing or spreadsheet applications), operating systems, image-related applications, video-related applications, and the like. Assets could also include entertainment or media content, such as movies, music, and electronic books, newspapers, and magazines.

Assets or portions of assets can reside at physical locations on datastores or systems that are remote from the asset streaming clients 102 and sent to the asset streaming clients 102 from the asset provider system 106 as a stream-enabled asset. The systems and datastore remote form the asset streaming clients 102 can be integrated as part of or coupled to the asset provider system 106. As understood herein, a "stream-enabled asset" is an asset (e.g., conventionally-coded application) that at least part of, is broken into portions (e.g., blocks, chunks, pages, etc.), such that the asset can be streamed on a per-portion basis to the asset streaming client 102. The assets or portions of the assets can be stored as compressed data in order to reduce the amount of bandwidth that is required to stream the assets or portion of the assets to the asset streaming client. The assets or the portions of the assets can also be stored as encrypted data.

As used herein, "exploiting" an asset can include interacting with content of the asset, viewing or displaying content of the asset or running or executing an application of or associated with the asset. The streaming clients 102 can exploit assets based on, at least in part, the type of asset. For example, if the asset is associated with an application, exploitation of the asset can include executing the application.

The streaming client 102 can exploit the stream-enabled assets based on the streamed portions of the stream-enabled assets. For example, if the portion of the stream-enabled asset is part of an application, the streaming client 102 can run the part of the application that is contained in or associated with the streamed portion of the stream-enabled asset. In one implementation, the streaming client 102 can exploit the stream-enabled asset after the portion of the portion of the stream-enabled asset is received and stored locally in the asset streaming clients 102. Specifically, the portions of the stream-enabled asset can be stored locally in the cache memory of the devices used by the asset streaming clients 102. The local cache memory can be updated as new stream-enabled assets are received and stored in the cache memory. Specifically, updating the cache memory can include deleting old assets or portions of assets from the cache memory. The old assets or portions of assets can be deleted based upon the length of time since they were last exploited. Even after old assets or portions of assets are deleted from the local cache memory, the assets or portions of assets still appear to reside locally in the cache memory to the user of the asset streaming clients. Specifically, if the user of the asset streaming clients request the assets or portions of assets that were deleted from the local cache memory, then the assets or portions of assets can be resent to the asset streaming clients and stored again in the local cache memory.

The asset streaming client 102 can begin exploiting a stream-enabled asset once it has received a sufficient number of portions (e.g., portions received reach or surpass an executable threshold) of the stream-enabled asset. The asset streaming client 102 can also continue to exploit the stream-enabled asset by receiving from the asset provider system 106, additional portions of the stream-enabled asset that are not stored on or do not reside locally on the asset streaming clients 102 but are possibly needed to continue exploiting the stream-enabled asset.

The asset streaming clients 102 can each be associated with a user or a group of users regardless of what device or system that the asset streaming clients 102 are operated on. The asset streaming clients 102 can be accessed by each user that is associated with the asset streaming client through a security mechanism or method that is presented through a graphical user interface. Specifically, in one example, a user can gain access to an asset streaming client that they are associated with by logging in, using a password, to the asset streaming client through a graphical user interface.

The asset streaming clients 102 can be implemented on different devices and the same user can gain access to the asset streaming client through a graphical user interface on each device. For example, a user can gain access to the asset streaming client through a first computer system and then gain access to the asset streaming client through a second computer system that is separate from the first computer system. As will be discussed in greater detail later, an instance of the asset streaming client can reside on the asset provider system 106. As the instance includes information as to what assets are available to the asset streaming client and the physical location of those assets, a user can gain access to the same assets or portions of assets on two distinct devices or systems.

In gaining access to the asset streaming clients 102 a user can further interact with and operate the assets or portions of assets that are available to the asset streaming client. The user's interactions and operation of the assets or portions of assets can dictate how the asset streaming client interacts with the asset or portions of the assets. Furthermore, the user's interactions and operation of the assets or portions of the assets can be used as the basis in generating requests for additional assets or portions of assets. For example, if a user interacts with a word processing application and selects a font tab, requests for portions of assets related to font can be generated and subsequently retrieved.

In the example of FIG. 1, the asset streaming client instances datastore 110 is coupled to the asset streaming clients 102 and the asset provider system 106 through the computer readable medium 104. In being coupled to the asset streaming clients 102 and the asset provider system 106, through the computer-readable medium 104, the asset streaming client instances datastore 110 can be implemented as part of either or both the asset provider system 106 and the asset streaming clients 102.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

The datastores described in this paper can be cloud-based datastores that are compatible with a cloud-based computing system and cloud-based engines. Therefore, parts or the entirety of the asset streaming client instances datastore 110 can be integrated in the cloud and be compatible with cloud-based computing systems.

The asset streaming client instances datastore 110 contains the instances of the asset streaming clients 102. Each instance is a map of all of the assets that are available to a specific asset streaming client. Specifically, the instance can include metadata that identifies the available assets. An asset can be available to a specific asset streaming client, if the asset streaming client is authorized to exploit the asset, e.g. if the asset streaming client has a license to use the asset. For example, if a streaming client has purchased the right to use an application, then the application, as an asset, is available. The instance can include an access control token that allows the asset streaming clients 102 to access an available asset, wherein the asset is accessed by the asset streaming clients 102 in accordance with the access control token. Alternatively, the access control token can be generated by and sent by the asset provider system 106.

Additionally, the instance can include the location information of available assets and portions of available assets. The location information can include physical addresses or uniform resource locators (hereinafter URLs) of the assets and portions of assets and logical addresses of the assets and portions of assets. The physical addresses can represent physical locations on the asset streaming clients 102. The physical addresses or URLs of the portions of the stream-based assets can also represent physical locations on systems or datastores remote from the asset streaming clients 102. The location information can also include the directories or subdirectories in which a portion of the asset resides. Additionally, the location information can include the logical address of the portions of the assets, including the portions of the stream-based assets. The location information can be used to retrieve assets or portions of assets so that the asset streaming clients 102 can exploit the assets.

The location information can be implemented in part like a translation lookaside buffer (hereinafter TLB). Specifically, the TLB can include a map of logical addresses of assets or portions of assets and the corresponding physical addresses of assets or portions of assets. The TLB can be searched by looking up a logical address of an asset or portions of an asset and returning the physical address of the asset or portion of an asset if a match is found to the logical address. Additionally, if the physical address of an asset or a portion of an asset changes, the TLB can be updated to reflect the change in the physical address. The TLB in being part of the instances stored in the instances datastore 110, can be updated by the asset streaming systems 108.

The instances can also include asset identification information. The asset identification information can include whether an asset is a stream-enabled asset. The asset identification information can be used in the retrieval of the portions of an asset, including the stream-enabled asset. For example, if it is know that an asset is a stream-enabled asset, such information can be used to determine that some or all of the portions of the stream-enabled asset are stored or reside on systems or datastores that are remote from the asset streaming clients 102.

Furthermore, the instances can also include state information of the asset streaming clients 102. The state information can include what assets are being exploited by a specific asset streaming client at the time the instance is created. The state information can also include how the assets are being exploited by a specific asset streaming client. For example, the state information can include which assets are being displayed through a user interface associated with the asset streaming client. In one implementation the state information can be a snapshot of all of the assets that are open on a user interface associated with a specific asset streaming client and how those assets are displayed on the user interface. The state information can be used as a mechanism for data recovery. Specifically, in the event of a catastrophic failure or crash of the asset streaming client, the state information can be used to restore the state of an asset streaming client to the state that existed on an asset streaming client before the catastrophic failure or crash.

Additionally, the instance can also include asset history information. The asset history information can include what assets have been exploited by the asset streaming client during a period of time. The asset history information can be used to create asset association information, which can be included as part of the instance.

The asset association information can include information about the degree to which different assets or portions of assets are related. Specifically, the degree to which assets or portions of assets are related can be based upon whether assets are exploited together or within a specific or close amount of time. For example, if an asset streaming client runs a first application and immediately runs a second application after running the first application, then the degree to which the asset of or associated with the first application is related to the asset of or associated with the second application is high. The degree of relation between assets can be determined through any relational algorithm or determination method and can be expressed through any assessment mechanism or value, e.g. a relation score.

The instances can also include information about the characteristics of the asset streaming clients that exploit specific assets. The characteristics of the asset streaming client can include information about the users of the asset streaming client and the geographical locations of the asset streaming clients that exploit a specific asset. For example, if a user continuously uses the same assets, the characteristics can include the identification of the assets that the user constantly uses. In another example, if users in a certain geographical region read a specific section of a digital newspaper, then the asset association information can include data that relates all asset streaming clients that are used within the geographical region to the specific section of the digital newspaper. The asset association information can be used to retrieve and push specific assets or portions of assets to the asset streaming clients 102 before the asset streaming clients 102 generate and send out requests for the specific assets or portions of assets. For example, if an asset streaming client 102 begins to run a first application, a second application that is associated with the first application, as can be determined from the asset association information, can be retrieved and pushed to the streaming client 102 before the streaming client 102 generated requests for the second application.

Additionally, the instances can include information about the order of the portions of the assets which includes the order in which the portions of the assets are used in order to exploit the assets. Such information can be generated by an asset streaming client that is exploiting the application. The information can also be generated based upon the order in which the portions of the assets are sent to the asset streaming clients 102.

Each instance can be unique for each asset streaming client of the asset streaming clients 102. As a result, each instance can contain information only related to a single asset streaming client. The instance can be created for a given asset streaming client at any time. In one implementation, the instances can be created for a given asset streaming client after the occurrence of a specific event. Specifically, a new instance can be created for a specific asset streaming client whenever a new asset becomes available to the asset streaming client. For example, an instance can be created when the specific asset streaming client has purchased the right to use a given application. In another example, an instance can be created whenever the asset streaming client begins exploiting an available asset.

The creation of a new instance can include updating a previously created instance. The previously created instance can be removed from the asset streaming client instance datastore 110 after a new instance is created by updating the previously created instance. As a result, the new instance can replace the previously created instance that was updated to create the new instance. The previously created instance that is updated to create the new instance can also remain on the asset streaming client instance datastore 110. As a result, the previously created instances can be used to restore the asset streaming client to the state that is described by the previously created instance.

The instances can include time stamps that signify when each instance was created. The timestamps can be used to restore the asset streaming client to a specific state that existed at a certain time. As the asset streaming client instances datastore 110 can contain any number of instances for an asset streaming client, the timestamps of the instance can be used to restore the asset streaming clients to a state that the asset streaming client was in at any time an instance was created. The timestamps can also be used to determine at what times assets became available to an asset streaming client, and for how long the assets were available to the asset streaming client.

The asset streaming clients 102, each include asset streaming systems 108-1 to 108-*n* (collectively referred to as "asset streaming systems 108"). As will be discussed in greater detail in the description of the other FIGs. in this paper, the asset streaming systems 108 are integrated, at least in part, on the asset streaming clients 102 in the abstraction layer of the operating system of the asset streaming clients 102 or in an abstraction layer that is beneath the abstraction layer of an operating system of the asset streaming clients 102.

Through the implementation of the asset streaming systems 108 in the abstraction layer of the operating system or in an abstraction layer that is beneath the abstraction layer of the operating system, the stream-enabled assets no longer need to be streamified before becoming a stream-enabled asset. Streamification of an asset includes exploiting an asset on a test bed machine to determine which requests will be made and sent to the operating system when the asset is exploited. The requests can be used to spoof the system registry. In operation, these requests can be retrieved before they are sent to the operating system so that the streaming system can retrieve the blocks of data based on the requests. If the requests were not retrieved by the streaming system and instead were sent to the operating system, the entire system would crash as the stream-enabled asset would not reside locally on the system and therefore the operating system would not be able to fulfill the request. Therefore, streamification was necessary to make a stream-enabled asset that can be used within a streaming system. However, in the systems and methods described in this paper, as the streaming engine is integrated either as part of the operating system or at an abstraction layer below the operating system, there is no risk that the system will crash, if the operating system receives a request for a stream-enabled asset that does not reside locally on the system.

Additionally, streamification by exploiting an asset on a test bed machine is also used to determine the order in which the blocks or pages of a stream-based asset need to be sent to the asset in order to exploit the asset. However, in the current system, the order in which the portions of the streaming asset are sent to the asset streaming clients 102 does not need to be known. Specifically, in being integrated as part of the operating system or beneath the operating system the asset streaming system can make the requests for specific portions of the asset in real-time in the specific order that the portions of the asset are needed in order to properly exploit the asset. The asset streaming system can use the information about the order of the portions of the assets, as is contained in the instances, to further make requests for the correct specific portions of the asset.

Furthermore the information about the order of the portions of the assets contained in the instances can be used to construct a partial asset. The partial asset can include the portions of the asset that are necessary at the beginning to exploit an asset. The partial asset can then be sent to the asset streaming clients 102 where the partial asset can then be exploited with the asset streaming clients appearing to have the entire asset.

Additionally, as the asset streaming systems 108 are integrated as part of the operating system or at an abstraction layer beneath the operating system abstraction layer, there is no need to spoof and virtualize the registry. Specifically, as requests for assets, regardless of whether they are present on the device on which the asset streaming clients 102 are running, are sent to the operating system, which includes the asset streaming system, of the asset streaming client, there is no need to spoof the registry so that the operating system thinks that an asset is contained locally.

The asset streaming systems 108 is coupled to the asset streaming clients 102, the asset provider system 106 and the asset streaming client instances datastore 110. The asset streaming systems 108 can be configured to receive requests to retrieve assets or portions of assets and retrieve the assets or portions of assets based upon the requests.

The asset streaming systems 108 can receive a request to retrieve a stream-enabled asset, so that an asset streaming client can begin to exploit the stream-enabled asset. The request can be generated by an operating system or from a system that is integrated on the asset streaming client beneath the abstraction layer in which the operating system resides, such as hardware firmware. For example, if the request is to being exploiting an asset that is an application, the asset streaming system can receive the request from the operating system on which the application will be run. In another example, if the request is to begin exploiting an asset that is an operating system, the asset streaming system can receive the request from hardware firmware on which the operating system will run. In the previously described example, the asset streaming system can be implemented with a hypervisor on an abstraction layer that is beneath the layer in which the requested operating system will reside. In another example, if the request is to begin exploiting an asset that is an operating system, the asset streaming system can receive the request from another operating system, on which the requested operating system will run. In the previously described example, the asset streaming system can be integrated as part of the abstraction layer of the operating system on which the requested operating system will run.

The asset streaming systems 108 can also receive a request to retrieve a portion of an asset for an asset that is currently being exploited by the asset streaming clients 102, so that the asset streaming clients 102 can continue exploiting the asset. Specifically, if an application is running on an asset streaming client, the asset streaming system can receive a request to retrieve a portion of the asset that is necessary to continue running the application. For example, if the asset is an application and the asset streaming system is integrated as part of an operating system, the application can generate a request that is sent to the asset streaming system as part of the operating system. Alternatively, if the asset is an application and the asset streaming system is integrated, at least in part, in a layer beneath the operating system, the application can generate a request that is sent to the operating system, which subsequently can send the request to the asset streaming system. In another example, if the asset is an operating system, the operating system being exploited as the asset can generate the request and send it to the asset streaming system or another operating system in which the asset streaming system is integrated.

The requests to retrieve an asset or a portion of an asset received by the asset streaming systems 108 can include data related to the identification of the asset or the portion of the asset. The asset streaming systems 108 can use the identification of the asset or the portion of the asset along with the information and data contained as part of the instances stored in the asset streaming client instances datastore 110 to retrieve the asset or portion of the asset identified in the received request. For example, the asset streaming systems 108 can receive a request to retrieve a portion of an application. The asset streaming systems 108 can use the identification of the portion of the application to determine the physical storage address of the portion of the application as is described in the location information contained in the instance of a specific asset streaming client in the asset streaming client instances datastore 110. The asset streaming systems 108 can then retrieve the portion of the application from the physical storage address.

If the physical location where the assets or the portions of assets are stored, is on the device or system on which the asset streaming client is being used, then the asset streaming systems 108 can retrieve the assets or the portions of the assets from the local device memory, e.g. the local cache memory, based upon the location information of the asset that is contained within the instance. Alternatively, the asset streaming systems 108 can retrieve the asset or portions of the assets from the local device memory without using the location information of the asset that is contained within the instance. Specifically, the asset streaming systems 108 can search the local device memory until it finds data that is associated with a particular tag, wherein the data includes the requested asset or portions of the asset. The tag can include the identification of the asset or portions of the asset that is received by the asset streaming systems in the request to retrieve the asset or the portions of the assets.

If the physical location where the assets or the portions of assets are stored, in on a system or datastore which is remote from the device on which the asset streaming client is being used, then the asset streaming systems 108 can retrieve the assets or the portions of the assets from the remote system or datastore through the asset provider system 106. In retrieving the asset or the portions of the assets through the asset provider system 106, the asset streaming systems 108 can generate a request to retrieve an asset or portions of an asset. The request to retrieve an asset or portions of an asset can be sent to the asset provider system 106. The request can include the identification of the assets or the portions of the assets and the physical storage location of the assets or the portions of the assets. The asset provider system 106 can then retrieve the assets or the portions of the assets based upon the request and send the assets or the portions of the assets to the asset streaming clients 102.

The asset streaming systems 108 can also function to determine whether a requested asset or a portion of an asset is available to an asset streaming client and retrieve the asset or portion of the asset if it is available to the asset streaming client. In determining whether or not an asset or a portion of an asset is available to an asset streaming client, the asset streaming systems 108 can use the information contained in the instances stored in the asset streaming client instances datastore 110. Specifically, as each instance is a map of the assets available to an asset streaming client, the asset streaming systems 108 can determine whether or not an asset is available to a specific asset streaming client based upon the instance. If the asset streaming systems 108 determine that an asset is not available to a specific asset streaming client, then the asset streaming systems 108 cannot retrieve the asset or the portion of the asset.

As discussed previously, the assets and the portions of assets can be stored as encrypted data regardless of the physical location at which the assets and the portions of the assets are stored. As discussed previously, the physical locations can be on systems or datastores that are part of the asset streaming client and physical locations on systems or datastores that are remote form the asset streaming client. Not all of the portions of the assets need to be stored as encrypted data. For example, only a main executable file can be encrypted, to thereby increase performance in reducing the number of assets that need to be decrypted. Furthermore, the assets or portions of the assets can be sent to the asset streaming systems 108 from the asset provider system 106 using encryption, such as the AES-256 encryption standard. The various methods systems related to data security and encryption described in U.S. Pat. No. 7,577,751 entitled "Software Streaming System and Method", which is hereby incorporated by reference, can be used and integrated with the systems and methods described in this paper.

Specifically, the asset streaming systems 108 may decrypt received assets or portions of assets, if necessary in order to exploit the asset. The asset streaming systems 108 can be configured to prevent the asset streaming clients 102 from exploiting assets, including stream-enabled assets, when the asset streaming clients 102 are not connected to the asset provider system 106. Specifically, the asset streaming systems 108 can be configured to not decrypt received assets or portions of assets or not copy received assets or portions of assets into the memory of the asset streaming clients 102 if an ungraceful disconnect occurs between the asset streaming clients 102 and the asset provider system 106. The encryption technique can also include the asset streaming systems 108 not allowing an application or an operating system to be run on the asset streaming clients 102 if an ungraceful disconnect occurs. An ungraceful disconnect can include if an asset streaming client is intentionally disconnected from the asset provider system 106 or if any crashes occur, etc.

Alternatively, the asset streaming systems 108 can receive assets or portions of assets and send them to the memory cache of the asset streaming clients 102 so that the streaming clients 102 can exploit the assets or portions of assets regardless if the asset streaming clients 102 are coupled to the asset provider system 106. Specifically, as the assets or portions of the assets are stored in the memory cache of the asset streaming clients 102, even if the asset streaming clients 102 are not coupled to the asset provider system 106, e.g. when the asset streaming clients 102 are offline, the asset streaming clients 102 can still exploit the assets or the portions of assets. Specifically, the asset streaming systems 108 can decrypt the encrypted assets or portions of assets that are stored in the memory cache of the asset streaming clients 102 while the asset streaming clients 102 are not coupled to the asset provider system 106, so that the asset streaming clients 102 can exploit the assets or the portions of assets.

The asset streaming systems 108 can function to allow a user to be granted rights to assets that are not available to the asset streaming clients 102 to which the user or users associated with the asset streaming clients 102 wish to gain access. Specifically, a user can input through a graphical user interface of a device that the asset streaming client is being run on, a request to exploit an asset. If the asset is not available to a user, the asset streaming client can retrieve the corresponding pages or assets to display or put before the user through which the user can gain access to the asset. The asset streaming client can retrieve such corresponding pages or assets through the asset provider system 106. For example, the asset streaming systems 108 can retrieve, from the asset provider system 106, a webpage through which a user can purchase the rights to use an asset so that it becomes available to the asset streaming clients 102 associated with the user so that the asset streaming clients 102 can exploit the asset.

The asset streaming systems 108 can also function to manage the instances that are stored in the asset streaming client instances datastore 110. In managing the instances, the asset streaming systems 108 can generate any of the information that is contained within the instances. Specifically, the asset streaming systems 108 can create new instances or modify instances of an asset streaming client when the assets that an asset streaming client is allowed to access change. For example, if a user has purchased a right to exploit a new asset, the asset streaming systems 108 of the asset streaming clients 102 associated with the user can modify the instances of the asset streaming clients to include that the new asset is an allowed asset. The asset streaming systems 108 can update the instances by including the map to the physical location of the portions of the new asset. The asset streaming systems 108 can also update the instance or create a new instance by receiving an access control token for the new asset and including the access control token as part of the newly created instance or modified instance. The access control token can signify that the asset streaming clients 102 have a right to receive and exploit the new asset. As a result, the asset streaming systems 108 can retrieve the new asset or portions of the new asset based on the updated or newly created instances stored in the asset streaming client instances datastore 110.

In managing the instances of the asset streaming clients 102, the asset streaming systems 108 can modify a previously created instance or create a new instance based on a change in the state of the asset streaming clients 102. For example, if an asset streaming client begins running a new application, the asset streaming systems 108 can reflect such change in the state of the asset streaming clients 102 by creating a new instance or modifying an already existing instance.

The asset streaming systems 108 can generate the information that is contained within the instances as encrypted data. The asset streaming system 108 can then send the information that is contained within the instances to the asset streaming client instances datastore 110 as encrypted data. This information can include data that is related to the users of the asset streaming clients 102, e.g. the previously described characteristics of the asset streaming clients data. By the asset streaming systems 108 encrypting data, data that can be regarded as sensitive to a user of the asset streaming clients 102, is encrypted at the source of the data, and not only the asset provider system side of the data, thereby preventing misuse of the data. Furthermore, the asset streaming systems 108 can send the encrypted data to the asset streaming client instances datastore 110 using encryption, such as the AES-256 encryption standard.

Figure 2:
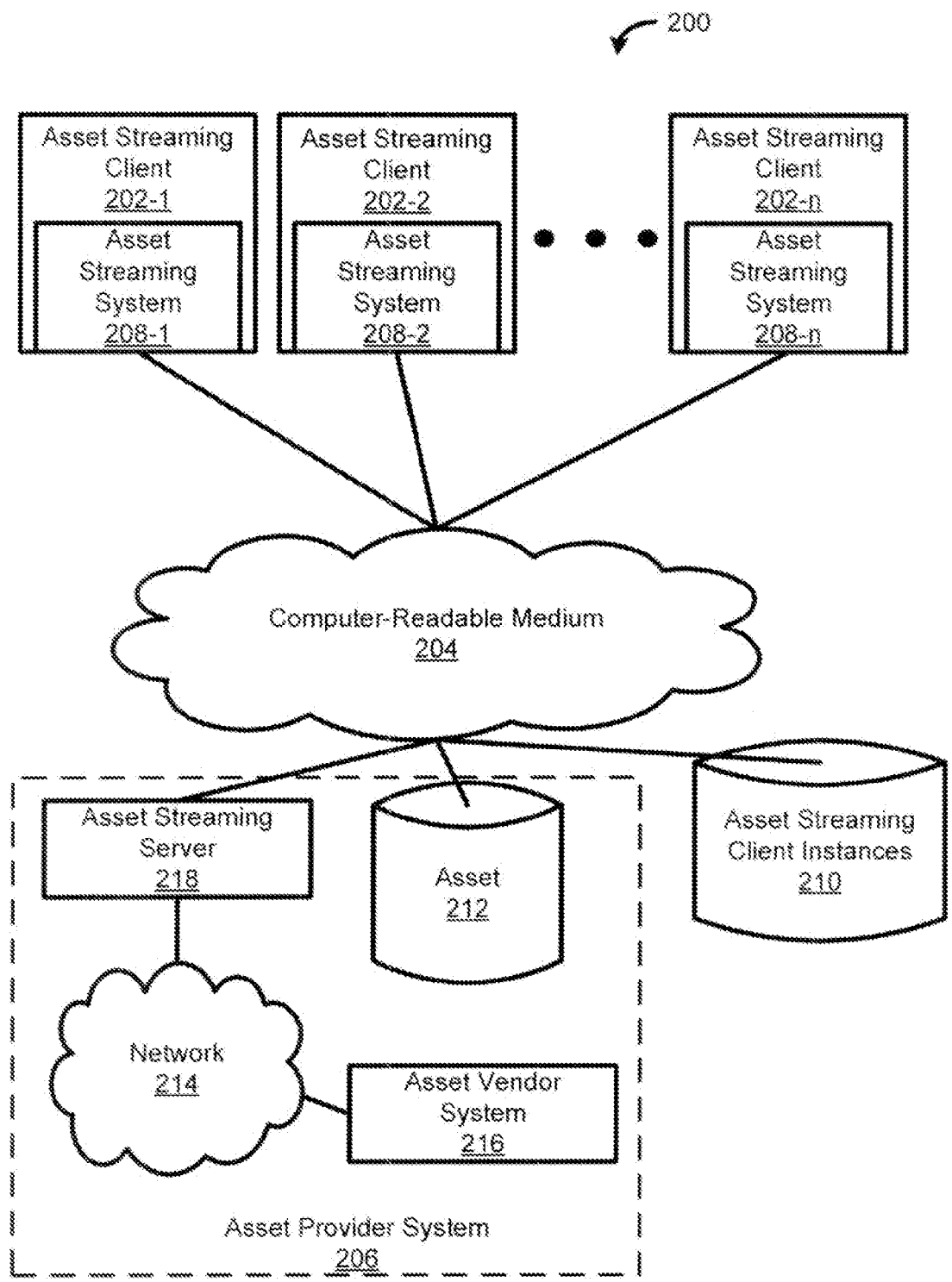
FIG. 2 depicts a diagram of another example of an asset streaming system.

FIG. 2 depicts a diagram 200 of another example of an asset streaming system. The system includes asset streaming clients 202-1 to 202-n (collectively referred to as "asset streaming clients 202") coupled to an asset provider system 206 and an asset streaming client instances datastore 210 through a computer-readable medium 204. The asset streaming clients 202 include asset streaming systems 208-1 to 208-n (collectively referred to as "asset streaming systems 208"). The asset streaming systems 208, the asset streaming clients 202, the asset provider system 206, the asset streaming clients 202 can be implemented the same and perform the same functions as any of the asset streaming clients, the asset streaming systems and the asset provider systems described in any of the FIGs. in this paper. The asset streaming client instances datastore 210 can include the same information as the asset streaming clients instances datastores described in any of the FIGs. in this paper.

The asset provider system 206 includes an asset streaming server 218, an asset datastore 212, and an asset vendor system 216. Both the asset streaming server 218 and the asset datastore 212 can be coupled to the computer-readable medium 204.

For illustrative purposes, the asset streaming server 218 is described in this example as serving content. Accordingly, in this example, the asset streaming server 218 can be referred to as a content server. A web server, which is one type of content server, is typically at least one computer system that operates as a server computer system and is configured to operate with the protocols of the World Wide Web and is coupled to the Internet. Unless context dictates otherwise, a server as used in this paper includes at least a portion of a computer system running server software.

The asset datastore 212 can contain the assets or portions of assets, including stream-enabled assets. The asset streaming server 218 can retrieve an asset or a portions of an asset that is stored in the assets datastore 212 based on a request to retrieve an asset or a portions of an asset that is generated by the asset streaming systems 208. Alternatively, the asset streaming server 218 can retrieve assets that are predicted to be needed by the asset streaming clients 202, as will be further discussed later, from the asset datastore 212 and send the predicted assets to the asset streaming clients 202.

The asset streaming server 218 is coupled to the asset vendor system 216 through a network 214. The asset vendor system 216 can be associated with a third party vendor who generates the assets. The asset vendor system 216 can include methods for gaining a right or license to exploit an asset. For example, the asset vendor system 216 can provide pages through which a user can submit payment information.

A user of the asset streaming client can request a new asset, a new asset being an asset that the asset streaming client associated with the user is not allowed to access. In requesting a new asset, the asset streaming systems 208 can generate a request to gain access and retrieve the new asset. The request can be sent to the asset provider system 206. The asset provider system can check to determine whether or not the asset is stored in the asset datastore 212. The asset streaming server 218 can retrieve from the asset vendor system all pages or information that are necessary for the asset streaming clients 202 to gain the right to exploit the asset. The asset streaming server 218 can send the pages and information that are necessary to gain the right to exploit the asset to the asset streaming client, through which the user can input the required information necessary to gain the right to exploit the asset. The asset streaming server 218 can send the information input the user back to the asset vendor system 216 to gain approval to allow the asset streaming client the right to exploit the new asset.

Once the asset streaming clients 202 gain approval to exploit the new asset, the asset streaming systems 208 can update the instances to reflect the change that the asset streaming clients 202 are allowed to exploit the new asset. The asset streaming systems 208 can update the instances by modifying an already existing instance stored in the asset streaming client instances datastore 210 or create a new instance that is stored in the asset streaming client instances datastore 210.

Additionally, if the new asset is not located on the asset datastore 212, the asset streaming server 218 can retrieve the new asset from the asset vendor system 216, if the asset vendor system 216 approves of the asset streaming client being allowed to exploit the asset. After retrieving the new asset or portions of the new asset, the asset streaming server 218 can store the new asset or portions of the new asset in the asset datastore 212. Also if the asset streaming systems 208 have sent a request to actually being exploiting the new asset, the asset streaming server 218 can retrieve the new asset or portions of the new asset from the asset datastore 212 and send it to the asset streaming clients 202.

As more asset streaming clients are granted the right to exploit an asset, the asset streaming systems 208 of the corresponding asset streaming clients granted the right to exploit the asset, can update the instance of the corresponding asset streaming clients. Specifically, the instance can be updated to reflect the change that the asset streaming clients 202 have gained the right to exploit the asset.

Only one copy, received from the asset vendor system 216, of the new asset has to be stored in the asset datastore 212. Specifically, multiple asset streaming clients can be sent the asset or portions of the asset by the asset streaming server 218 simultaneously. Therefore, multiple asset streaming clients can exploit the asset simultaneously based off of a single copy of the asset. By only having one copy of the asset, the required amount of storage space of the asset datastore 212 is greatly reduced.

Figure 3:
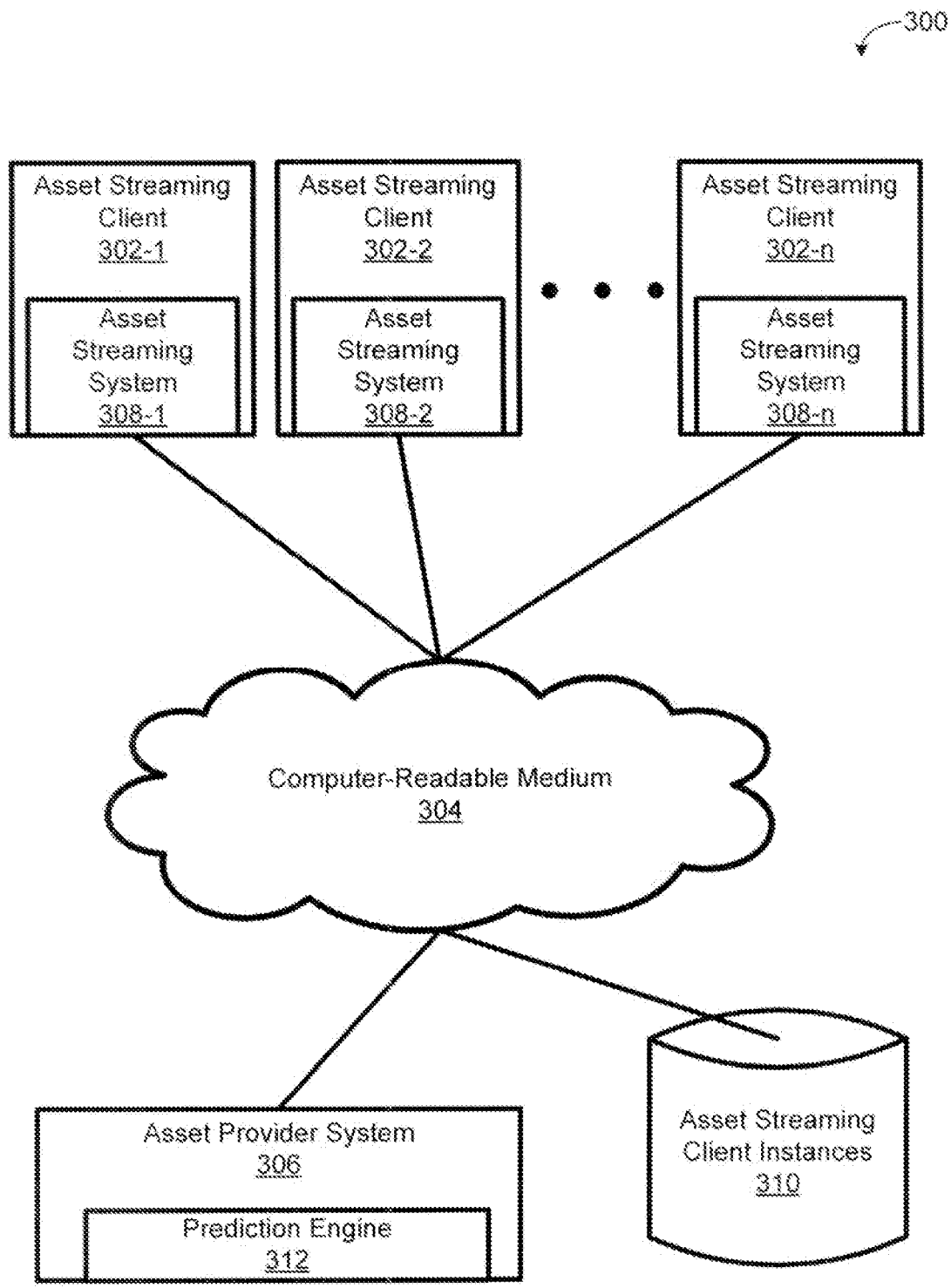
FIG. 3 depicts a diagram of an example of another asset streaming system.

FIG. 3 depicts a diagram 300 of an example of another asset streaming system. The system includes asset streaming clients 302-1 to 302-n (collectively referred to as "asset streaming clients 302") coupled to an asset provider system 306 and an asset streaming client instances datastore 310 through a computer-readable medium 304. The asset streaming clients 302 include asset streaming systems 308-1 to 308-n (collectively referred to as "asset streaming systems 308"). The asset streaming systems 308, the asset streaming clients 302, the asset provider system 306, the asset streaming clients 302 can be implemented the same as and perform the same functions as any of the asset streaming clients, the asset streaming systems and the asset provider systems described in any of the FIGs. in this paper. The asset streaming client instances datastore 310 can include the same information as any of the asset streaming clients instances datastores described in any of the FIGs. in this paper.

The asset provider system 306 includes a prediction engine 312. The predictive engine can function as and be implemented through any of the systems and methods described in U.S. Pat. No. 7,240,162 entitled "System and Method for Predictive Streaming", which is hereby incorporated by reference.

The prediction engine 312 can be configured to predict one or more assets or portions of assets, if any, the asset streaming clients 302 will request. The prediction engine 312 can include an aggressiveness parameter (not shown). If the aggressiveness is high, the prediction engine 312 is more likely to make a prediction than if the aggressiveness is low. In one example, the aggressiveness parameter is associated with a probability threshold. The probability threshold can be a cut-off probability that results in predictions being made for assets or portions of assets that are determined to have a probability of being requested that exceeds the cut-off probability. In another example, the prediction engine 312 can predict any asset or portions of assets with a probability of being requested that is higher than the probability threshold. In these examples, it should be noted that the aggressiveness parameter is low (i.e., the probability threshold is low) when aggressiveness is high. Nevertheless, for the purposes of linguistic clarity, hereinafter, it is assumed that the aggressiveness parameter is high when aggressiveness is high. For example, if the aggressiveness parameter is associated with a threshold probability, x, then the value of the aggressiveness parameter may be thought of as 1−x, which means the aggressiveness parameter is high when aggressiveness is high. This is for the purposes of linguistic clarity, and should not be construed as a limitation as to how the aggressiveness parameter is implemented. It should also be noted that the aggressiveness parameter is not limited to a threshold probability.

When the prediction engine 312 makes a prediction, the asset provider system 306 can communicate the prediction to the asset streaming clients 302. The prediction may include identifying data for one or more assets or portions of assets, each of which met aggressiveness criteria, such as by having a predicted probability of being requested that is higher than a probability threshold. Identifying data, as used herein, can be data sufficient to enable the asset streaming clients 302 to make a request for the assets or portions of assets that are associated with the identifying data. The identifying data can, for example, include an asset ID associated with a asset. This identifying data can facilitate predictive requests for assets or portions of assets before the assets or portions of assets are actually needed at the asset streaming clients 302, so that they can be exploited. In one example, wherein the identifying data is provided to an asset streaming client 302, the asset streaming client 302 can determine whether to request the asset or portions of assets associated with streaming data. This may help prevent downloading streaming data that the asset streaming clients 302 do not really want or need. For example, if the asset provider system 306 predicts that an asset streaming client will need streaming data associated with a first asset or portions of an asset, and sends streaming data associated with the first asset or portions of the first asset, the asset streaming client is unable to choose whether to receive the streaming data based on, for example, local factors. On the other hand, if the asset streaming client receives identifying data, the asset streaming client can determine whether it actually wants the streaming data. In an alternative embodiment, the asset provider system 306 can sometimes serve streaming data associated with a predicted asset or portion of an asset right away, possibly without even receiving a request for the predicted asset or portions of an asset from the asset streaming client.

The prediction engine 312 can give a weight to a number of assets or portions of assets. For example, the prediction engine 312 can predict a first asset or portions of an asset that is more likely to be requested than a second asset or portions of an asset (a probability parameter). The asset streaming client 302 can first request the assets or portions of assets with, for example, the highest probability of being requested. As another example, the prediction engine 312 can give greater weight to a first asset or portions of an asset over a second asset or portions of an asset if the prediction engine 312 predicts the first asset or portions of an asset will be requested sooner than the second asset or portions of an asset (a temporal parameter). As another example, the prediction engine 312 can give greater weight to a first asset or portions of an asset over a second asset or portions of an asset if the first asset or portions of an asset is larger than the second asset or portions of an asset (a size parameter). The prediction engine 312 may weigh parameters associated with the asset streaming client 302, as well. For example, if the asset streaming client 302 has a limited buffer size, the aggressiveness parameter may be set lower. As another example, if the download bandwidth is low, the prediction engine 312 can place more weight on temporal or size parameters. Alternatively, the asset streaming clients 302 can manage block requests according to local conditions, while the prediction engine 312 acts the same for all or a subset of all streaming clients.

The prediction engine 312 can use data from the instances stored in the asset streaming client instances datastore 310 to predict a subsequent asset or portions of an asset. For example, the prediction engine 312 can use information about the characteristics of the asset streaming clients, information about the degree to which different assets or portions of assets are related, asset history information, state information or any combination of, to predict a subsequent asset or portions of an asset. The subsequent asset or portions of an asset request can be for, for example, an asset or portions of an asset from the same streaming application as the initial asset or portions of an asset request, from a DLL, from a data file, from a different executable file, or from any other file or asset or portions of an asset. The asset provider system 306 sends streaming data associated with the requested asset or portions of an asset and identifying data associated with the predicted asset or portions of an asset to the asset streaming clients 302. The asset streaming client 302 can then decide whether to request the identified predicted asset or portions of an asset. For example, the asset streaming clients 302 may already have data for the asset or portions of an asset associated with the identifying data in a local cache. If the asset provider system 306 sends the data again, that is a waste of bandwidth and may slow down the execution of the streaming application. Since the asset provider system 306 sends identifying data instead of streaming the asset or portions of an asset, the asset streaming clients 302 can, for example, check the local cache first, and request the streaming asset or portions of an asset if it is not already available in the local cache.

In another example, the asset provider system 306 sends streaming data associated with the requested asset or portions of an asset and identifying data associated with one or more predicted asset or portions of an asset. The asset streaming clients 302 then can decide which of the identified asset or portions of an asset to request and, for example, in what order. Naturally, if the prediction engine 312 is correct in its prediction, the asset streaming clients 302 will eventually request a predicted asset or portions of an asset in due course even if the asset streaming clients 302 do not request the predicted asset or portions of an asset in response to receiving the identifying data.

Figure 4:
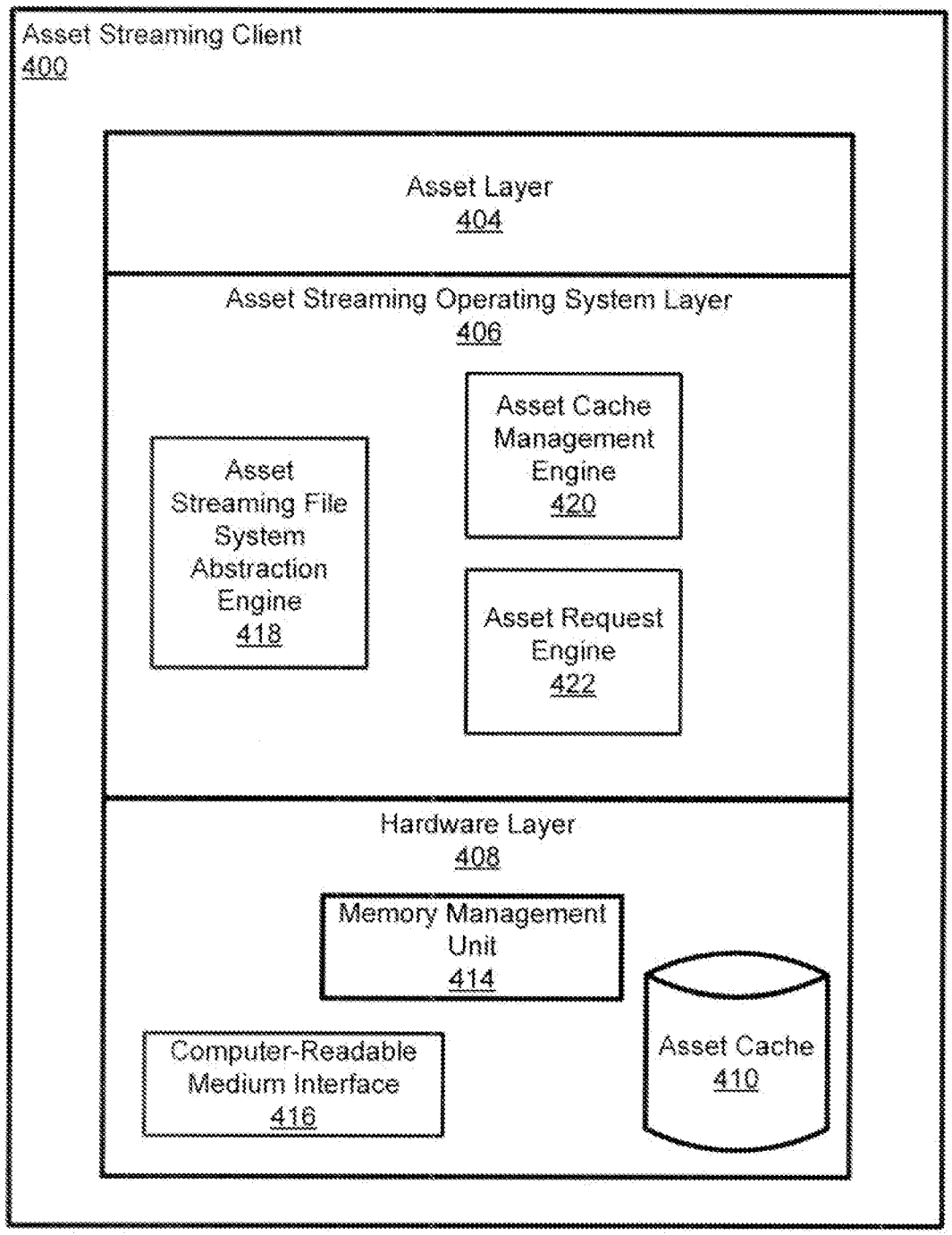
FIG. 4 depicts a diagram of an asset streaming client with an asset streaming system integrated with the operating system in the asset streaming operating system layer.

FIG. 4 depicts a diagram of an asset streaming client 400 with an asset streaming system integrated with the operating system in the asset streaming operating system layer 406. The asset streaming client 400 includes a hardware layer 408, an asset streaming operating system layer 406 and an asset layer 404. The asset layer is above the asset streaming operating system layer 406, while the asset streaming operating system layer 406 is above the hardware layer 408.

The operating system is integrated with the asset streaming system in the asset streaming operating system layer 406. The asset streaming system includes an asset streaming file system abstraction engine 418, an asset cache memory engine 420 and an asset request engine 422 that are all integrated as part of the asset streaming operating system layer. The asset streaming system 410 can perform any of the functions of the asset streaming systems described in the FIGs. of this paper. While, the asset streaming file system abstraction engine 418, the asset cache memory engine 420 and asset request engine 422 are shown as being wholly contained within the asset streaming operating system layer 406, it is appreciated that this is done merely for ease of presentation, and that as they are engines, they are also integrated through hardware components in the hardware layer 408.

The asset streaming file system abstraction engine 418 can function to abstract some of or all of the assets that are exploited by the asset streaming client 400 in the asset layer 400. The asset streaming file system abstraction engine 418 can also function to abstract some or all of the file system. The asset streaming file system abstraction engine 418 can abstract the assets and the files system based upon the information contained in the instances stored in the instances datastore. The operating system within the asset streaming operating system layer 406 can use the file system to exploit assets within the asset layer.

The hardware layer 408 can include the hardware components of the device or system upon which the asset streaming client 400 runs. The hardware layer can include an asset cache datastore 418, a computer-readable medium interface 416 and a memory management unit (hereinafter MMU) 414.

The asset cache datastore 418 is local computer-readable medium memory that exists on the device upon which the asset streaming client 400 is running or being used. As cache memory is of a limited size, data can be retained in the cache memory of the device based on the amount of time that it has been in the cache memory, the amount of times that it has been retrieved and used, or any other data retention policies and methods known in the art. Alternatively, the data can be retained in the cache memory based upon the amount of storage space taken up by the stored data.

The asset streaming system in the asset streaming operating system layer 406 can function to determine whether or not a specific asset is located within the asset cache 410. The asset streaming system can use the instances stored in the instances datastore to determine whether or not an asset is located within the asset cache 410. If the asset or the portion of the asset is located in the asset cache 410, the asset streaming system can use the asset cache management engine 420 to interface with the MMU and retrieve the asset or the portion of the asset.

While the MMU 414 is shown to be implemented wholly within the hardware layer 408, it is appreciated that portions of the MMU 414 can also be implemented as part of the operating system in the operating system layer 406. In being partly integrated in the operating system layer 406, along with the asset streaming system 410, the MMU 414 can quickly and easily communicate with the operating system and the asset streaming system 410 to seamlessly perform the functions of the MMU 414. Furthermore, as the asset, including stream-enabled assets, are run on the asset layer on top of the asset streaming operating system layer, the assets can be run directly in the virtual address space of the asset streaming operating system layer 406. As the hardware layer 408 is located directly beneath the asset streaming operation system layer 406, the MMU 414 can directly translate the logical addresses of the assets as they are being run in the virtual address space of the asset streaming operating system layer 406, to physical addresses of memory on the device, such as the asset cache 110. This is in contrast to previous streaming application systems and methods that require the assets to run on an virtualized operating system with a first virtual address space, that is run on top of a second operating system with a second virtual address space. Therefore in previous streaming application systems and methods, the MMU must translate the assets from two virtual address spaces to physical addresses.

The MMU 414 can function to map logical addresses of the requested assets or the portions of assets to physical addresses of the requested assets or portions of assets in the asset cache 410. The MMU can use a TLB to determine the physical addresses of assets or portions of assets. The MMU can return the asset or portions of the asset to the asset cache management engine 420.

If the asset streaming system determines that an asset or a portion of an asset is not located in the asset cache 410, the asset streaming system can generate a request to retrieve the asset from a remote location using the asset request engine 422. The asset request engine can integrate with the computer-readable medium interface to connect to a system or device that is remote from the device upon which the asset streaming client 400 is being run. Specifically, the asset request engine can send the request to an asset provider system through the computer-readable medium interface 416 and retrieve the asset from the asset provider system through the computer-readable medium interface 416.

The computer-readable medium interface 416 can include a network interface controller (hereinafter NIC). The NIC can function to allow the asset streaming system 410 to communicate with an asset provider system. The NIC can include a port through which the asset streaming system 410 can be coupled to the asset provider system. The NIC port can include an Ethernet port or any other means for creating a connection, as is known in the art.

The NIC port can also be used to create a wireless connection, such that the asset streaming system 410 is connected to the asset provider system through a wireless medium. The wireless medium can comply with the IEEE 802.11 standard or be 802.11 standards compatible. A medium or system that is 802.11 standards compatible complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard.

After the asset or the portion of the asset is retrieved by the asset request engine 422, the retrieved asset or portion of the asset can be sent to the asset cache management engine 420. The asset cache management engine can then interface with the MMU so that the asset can be stored in the asset cache. As mentioned previously it is advantageous for the asset streaming system to be implemented in the asset streaming operating system layer 416 that is adjacent the hardware layer as the logical locations of assets or portions of assets can be directly translated to physical locations in the asset cache 410. Another advantage is that the MMU can translate portions of assets to physical locations that are near other portions of assets that make up an asset based upon the logical addresses. Therefore the portions of assets can be stored at physical locations that are less segmented within the physical memory.

Figure 5:
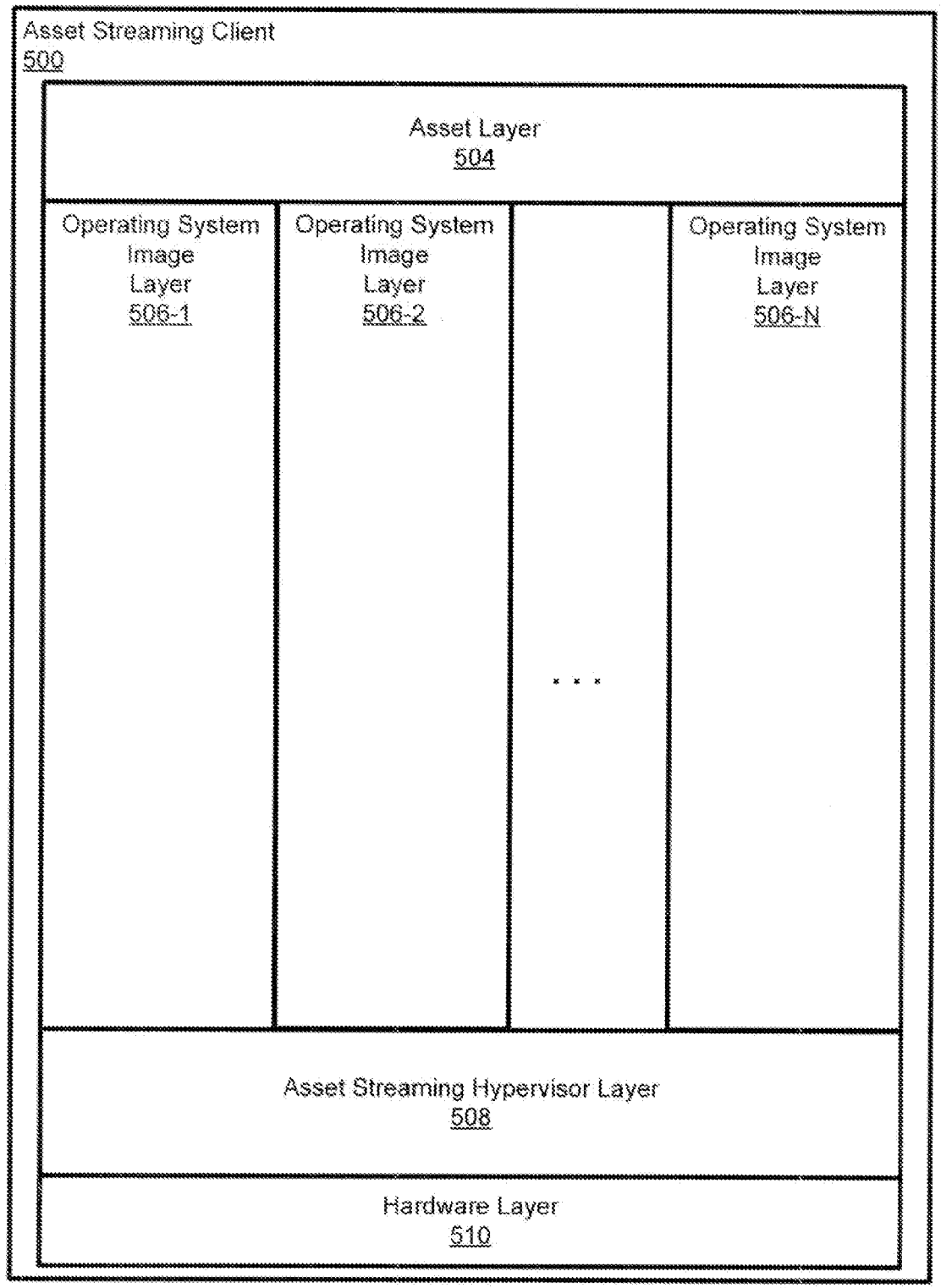
FIG. 5 depicts a diagram of an asset streaming client with an asset streaming system integrated in an abstraction layer beneath abstraction layer in which the operating system is integrated.

FIG. 5 depicts a diagram of an asset streaming client 500 with an asset streaming system integrated in an abstraction layer beneath abstraction layer in which the operating system is integrated. The asset streaming client 500 includes an asset layer 504, an asset streaming hypervisor layer 508 and a hardware layer 510. The asset streaming hypervisor layer 508 is directly above the hardware layer 510. The hardware layer 508 can include any of the components discussed in conjunction with the hardware layer of FIG. 4. The components can function according to any of the ways discussed in the description of the components in FIG. 4. Operating system image layers 506-1 to 506-*n* (collectively referred to as "operating system image layers 506") are in an abstraction level between the asset layer 504 and the asset streaming hypervisor layer 508.

In the asset streaming client of FIG. 5, the operating system image layers 506 can include images of virtual operating systems. The operating systems are virtual in that they appear to reside completely on the device on which the client is running but instead are stream-enabled assets that are streamed to the asset streaming client 500 through the asset streaming system located in the asset streaming hypervisor layer 508. A client can be running multiple virtual operating systems at the same time. Each of the virtual operating systems can run assets in the asset layer 504 located above the operating system image layers 506. The assets can also be stream-enabled assets that are streamed to the asset streaming client 500 through the asset streaming system integrated within the asset streaming hypervisor layer 508. The stream-based assets, whether they are operating systems that are exploited in the operating system image layers 506 or other assets that are exploited in the asset layer 504 can be streamed to the asset streaming client through any of the methods and systems described in this paper.

The asset streaming hypervisor layer 508 includes an integrated hypervisor. The hypervisor functions to create the virtual operating platform, upon which the operating systems in the operating system image layers 506 can run. The hypervisor can also manage the execution of the operating system in the operating system image layers 506. In managing the operating systems, the hypervisor can receive requests for assets or portions of assets from the operating systems. The hypervisor can interact with the asset streaming system also integrated in the asset streaming system layer to retrieve the assets from either local asset cache 410 or remote systems or datastores.

Figure 6:
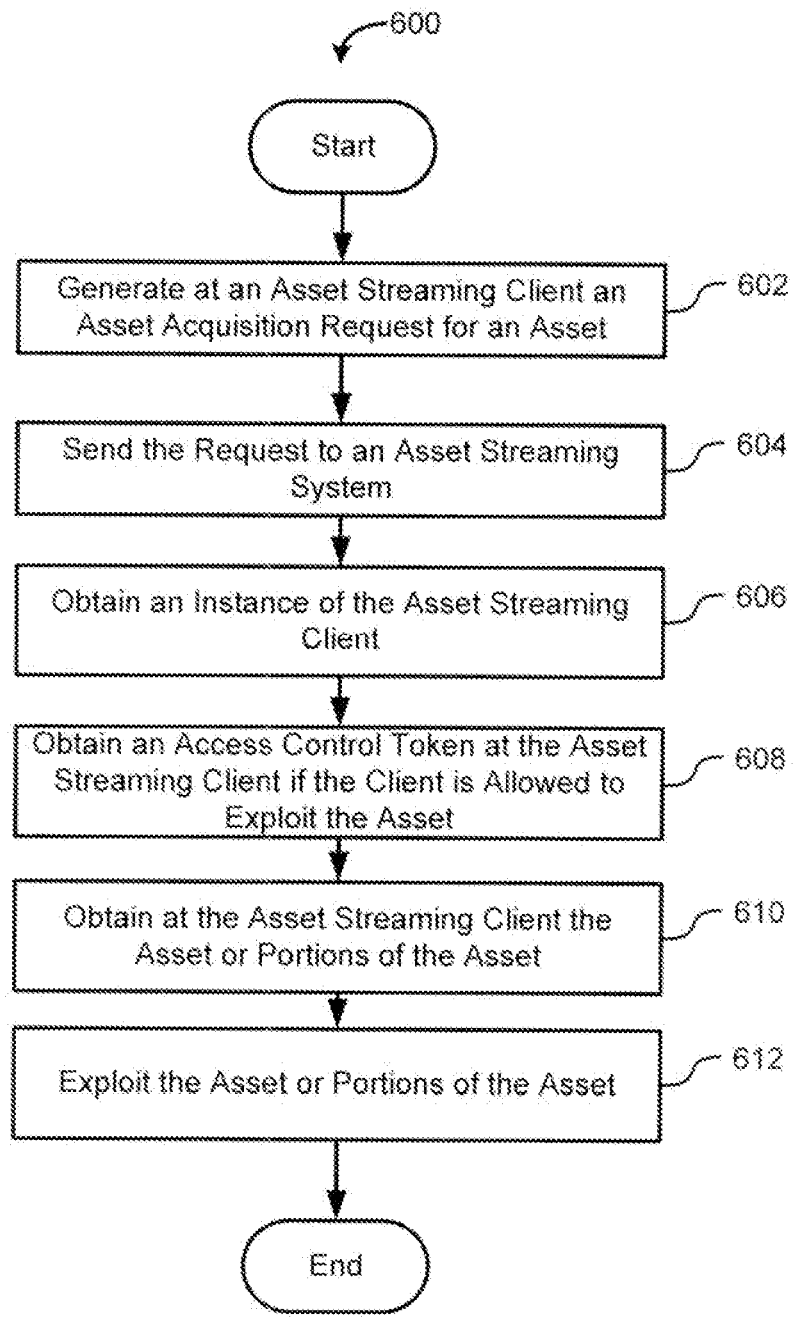
FIG. 6 depicts a diagram of a method of a client system retrieving an asset or a portion of an asset.

FIG. 6 depicts a diagram 600 of a method of a client system retrieving an asset or a portion of an asset. The method includes, at module 602, an asset streaming client generating a request for an asset or a portions of an asset. The request can be generated by an asset that is currently being exploited on the operating system. The request can also be generated by an operating system to begin exploiting an asset that is not currently being exploited in the asset layer. Alternatively, if the asset is an operating system, the request can be generated by hardware firmware.

At module 604, the method includes sending the request to retrieve an asset to an asset streaming system. The asset streaming system can be integrated as part of the operating system in the operating system abstraction layer. Alternatively, the asset streaming system can be integrated in a layer beneath the operating system abstraction layer. In being implemented in a layer beneath the operating system abstraction layer, the asset streaming system can be implemented with a hypervisor. As a result of being implemented in a layer beneath the operating system abstraction layer, the asset can be a stream-enabled asset that is an operating system.

At module 606, the method includes obtaining an instance of the asset streaming client. The instance can be stored in the asset streaming client instances datastore. The instance can include any of the information previously described as being included in an instance. The information can include whether an asset is available to the asset streaming client, and a map of the logical address of the asset or the portions of the asset to the physical address of the asset or portions of the asset.

At module 608, the method includes the client obtaining an access control token for the requested asset, if the client is allowed to exploit the asset. The access control token can be included as part of the received instance. Alternatively, the asset control token can be generated by and sent to the client by the asset provider system.

At module 610, the method includes obtaining, at the asset streaming client the requested asset or the portions of the requested asset. The asset or the portions of the requested asset can be obtained according to any of the methods and techniques discussed in this paper. Specifically, the asset can be obtained from the local memory of the device or system upon which the asset streaming client is being run. Alternatively, if the asset or the portions of the asset is not physically stored on the local memory, the asset can be obtained from the asset provider system. The information, including the map of the logical addresses to the physical addresses of assets or portions of assets, can be used to determine whether or not an asset is physically stored on local memory. The asset that is obtained from the asset provider system can be stored at physical locations in the memory of the device or system upon which the asset streaming client is being run.

At module 612, the method includes exploiting the asset or the portions of the asset that are received that are obtained by the asset streaming client. Exploiting the asset or the portions of the asset can include any of the previously mentioned operations discussed in conjunction with exploitation of an asset. Specifically, if the asset is an application, exploiting the asset can include running the application. Alternatively, if the asset is content, exploiting the asset can include displaying the content.

Figure 7:
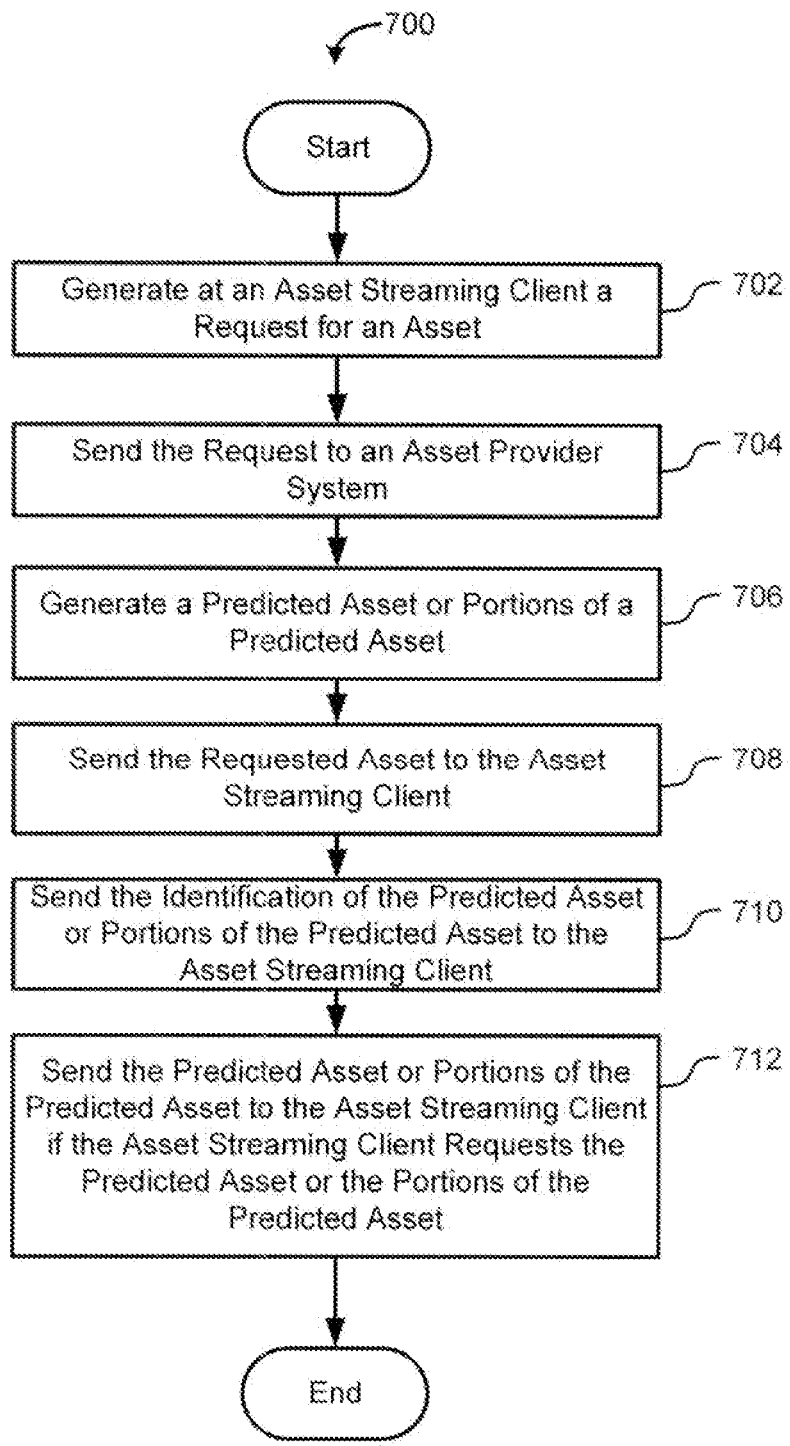
FIG. 7 depicts a diagram of a method of a client system retrieving an asset or a portion of an asset through predictive streaming.

FIG. 7 depicts a diagram 700 of a method of a client system retrieving an asset or a portion of an asset through predictive streaming. The method at begins, at module 702, with an asset streaming client generating a request for an asset. Next, at module 704, the request is sent to the asset provider system 704. The asset can be sent by the asset streaming system to the asset provider system. Next, at module 706, a predictive engine in the asset provider system can generate a predicted asset or portions of a predicted asset based upon the asset of the received request for an asset. Next, at module 708, the asset provider system can send the requested asset to the asset streaming client. Next, at module 710, the asset provider system can send the identification of the predicted asset or portions of the predicted asset to the asset streaming client. The asset streaming client can use the identification of the predicted asset or portions of the predicted asset to determine whether or not to request the predicted asset or portions of the predicted asset. Next, at module 712, if the asset streaming client requests the predicted asset or portions of the predicted asset, the asset provider system can send the predicted asset or the portions of the predicted asset to the asset streaming client.

Figure 8:
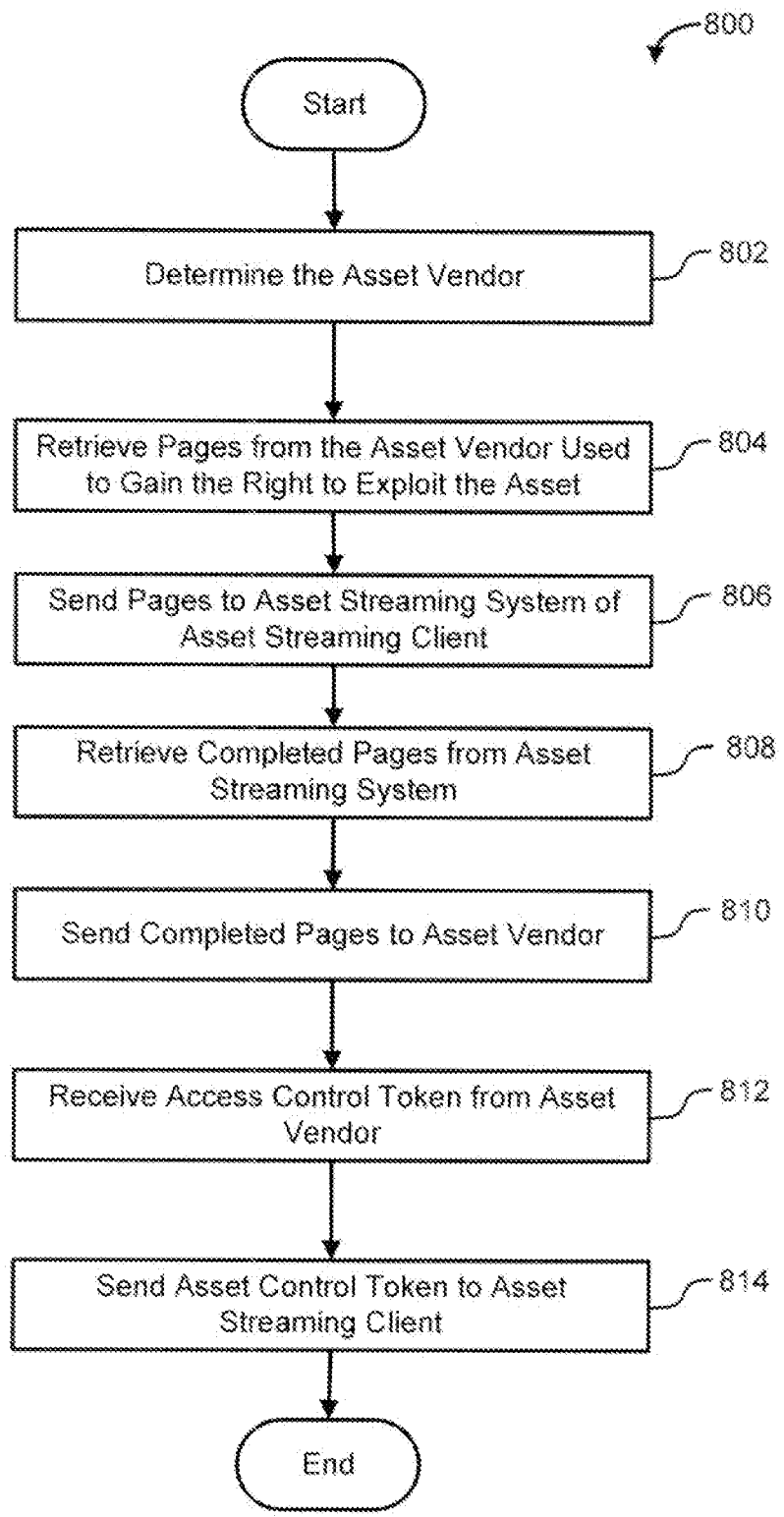
FIG. 8 depicts a diagram of a method of obtaining an access control token for an asset streaming client.

FIG. 8 depicts a diagram 800 of a method of obtaining an access control token for an asset streaming client. The method includes, first at module 802, determining the asset vendor 802 of a specific asset or portions of an asset. The asset vendor can be determined by the asset provider system. Next, at module 804, the asset provider system can retrieve the pages from the asset vendor that are used to gain the right to exploit the asset. The pages can be formed through which a user of the asset streaming client can input information in order to gain the right to exploit the asset. The information can be payment information of the user of the asset streaming client. Next, at module 806, the asset provider system can send the pages retrieved from the asset vendor to the asset streaming system of the asset streaming client. The asset streaming system can exploit the pages to cause the pages to be displayed so that the user can populate data field contained within the pages with information that is used by the asset vendor to determine whether or not to grant the asset streaming client the right to use the asset.

Next, at module 808, the asset provider system can retrieve the completed or partially completed pages from the asset streaming system. Next, at module 810, the asset provider system can send the completed or partially completed pages to the asset vendor or system of the asset vendor. The asset vendor can then determine whether or not to grant the asset streaming client the right to exploit the asset based upon the completed or partially completed pages. Next, at module 812, the asset provider system can receive the access control token from the asset vendor. The receipt of the asset provider system receiving the access control token from the asset vendor can be contingent on whether or not the asset vendor grants the asset streaming client the right to exploit the asset. Finally, at module 814, the asset provider system can send the access control token to the asset streaming client. The sending of the access control token to the asset streaming client by the asset provider system can be contingent on whether or not the asset vendor grants the asset streaming client the right to exploit the asset. For example, the asset vendor can send the access control token to the asset provider system so that future asset streaming clients can be sent the access control token, without the access control token being sent to the present asset streaming client.

Figure 9:
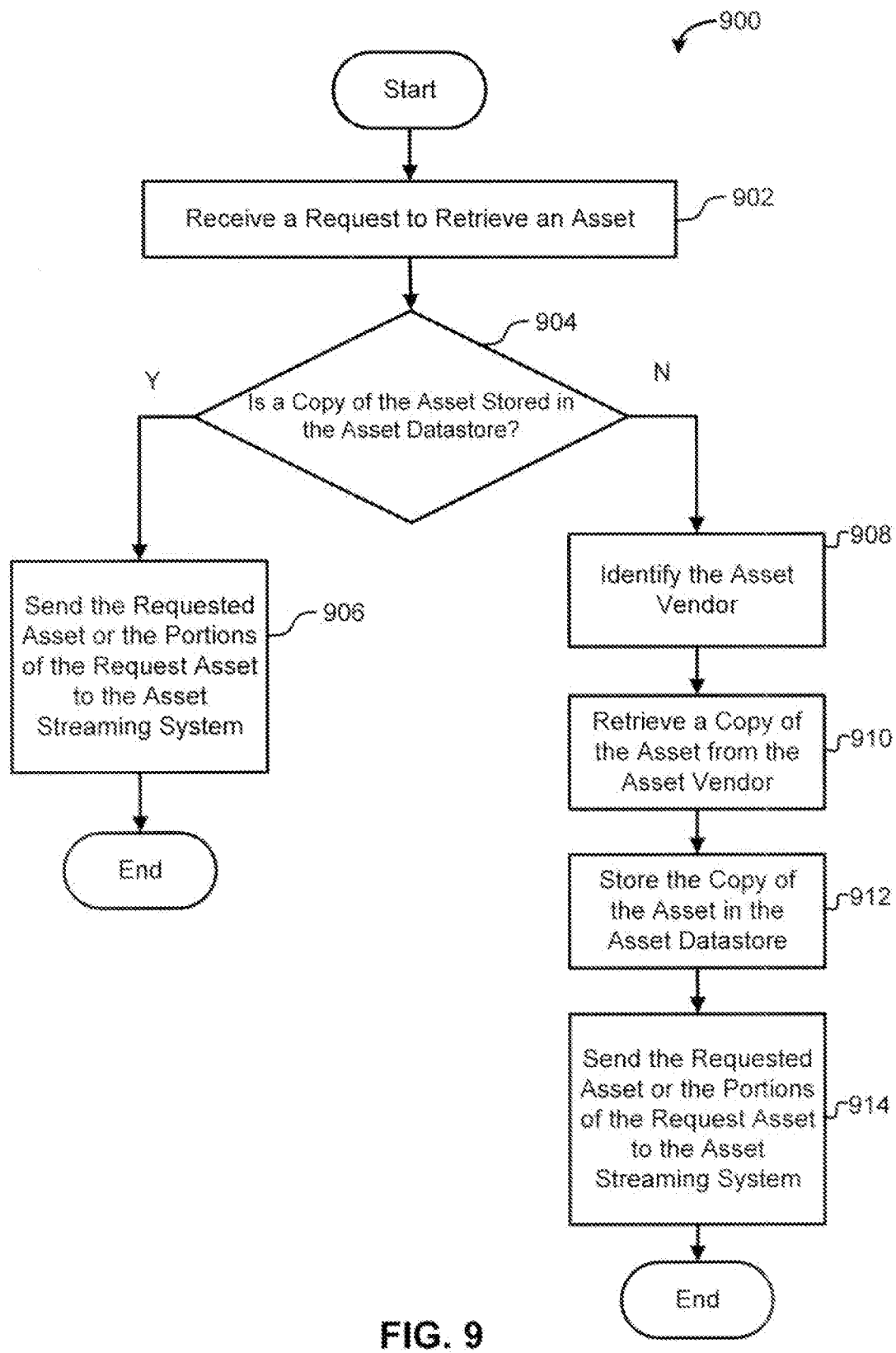
FIG. 9 depicts a diagram of a method by which an asset streaming client can receive an asset or a portion of an asset from an asset provider system.

FIG. 9 depicts a diagram 900 of a method by which an asset streaming client can receive an asset or a portion of an asset from an asset provider system. First, at module 902, a request is received from an asset streaming client to retrieve an asset or portions of an asset. The request can be received by an asset provider system or by an asset streaming system implemented within the client. Next at decision point 904, it is determined whether or not a copy of the asset or the portions of the asset is stored in the asset datastore that is coupled to the asset provider system. The asset provider system or the asset streaming system can determine whether or not the asset or the portions of the asset are stored in the asset datastore.

If it is determined, at point 904, that a copy of the asset or the portions of the asset are stored in the asset datastore, at module 906, the asset provider system can retrieve the asset or the portions of the asset, and send the requested asset or portions of the asset to the asset streaming system of an asset streaming client. The asset streaming client can then exploit the asset or the portions of the asset received from the asset provider system.

If it is determined, at point 904, that a copy of the asset or the portions of the asset are not stored in the asset datastore, then at module 908, the asset provider system, or the asset streaming system of the asset streaming client identifies the asset vendor of the asset or the portions of the asset. Next, at module 910, the asset provider system retrieves a copy of the asset or the portions of the asset from the asset vendor 910. Next, at module 912, the asset provider system can store the copy of the asset or the portions of the asset, retrieved from the asset vendor 910, in the asset datastore. Next, at module 914, the asset provider system can send the requested asset or portions of the asset to the asset streaming system of the asset streaming client. The asset streaming client can then exploit the asset or the portions of the asset received from the asset provider system.

We claim:

1. A method comprising:
    receiving, at an asset streaming system implemented as part of an asset streaming client in either an operating system abstraction layer or a lower abstraction layer beneath the operating system abstraction layer, a request for a portion of a stream-enabled asset, wherein the stream-enabled asset is a stream-enabled version of an operating system;
    determining, using an instance of the asset streaming client, whether the portion of the stream-enabled asset is stored in local storage on the asset streaming client or in remote storage from the asset streaming client;
    if it is determined that the portion of the stream-enabled asset is stored in the local storage, retrieving the portion of the stream-enabled asset from the local storage on the asset streaming client;
    if it is determined that the portion of the stream-enabled asset is stored in the remote storage:
        sending a request to retrieve the portion of the stream-enabled asset from the remote storage;
        receiving, at the asset streaming client, the portion of the stream-enabled asset from the remote storage in response to the request to retrieve the portion of the stream-enabled asset.

2. The method of claim 1, further comprising:
    receiving a request for a portion of another stream-enabled asset from the operating system, wherein the another stream-enabled asset is an application;
    determining, using an instance of the asset streaming client, whether the portion of the another stream-enabled asset is stored in the local storage on the asset streaming client or in the remote storage from the asset streaming client;
    if it is determined that the portion of the another stream-enabled asset is stored in the local storage, retrieving the portion of the another stream-enabled asset from the local storage on the asset streaming client;
    if it is determined that the portion of the another stream-enabled asset is stored in the remote storage:
        sending a request to retrieve the portion of the another stream-enabled asset from the remote storage;
        receiving, at the asset streaming client, the portion of the another stream-enabled asset from the remote storage in response to the request to retrieve the portion of the another stream-enabled asset.

3. The method of claim 1, wherein the request for the portion of the stream-enabled asset is received from a hypervisor implemented, at least in part, in the lower abstraction layer beneath the operating system abstraction layer.

4. The method of claim 1, further comprising:
    receiving, at the asset streaming client, an access control token of the stream-enabled asset;
    updating the instance of the asset streaming client to reflect that the asset streaming client has a right to exploit the stream-enabled asset.

5. The method of claim 1, further comprising:
    receiving, at the asset streaming client, a predicted portion of the stream-enabled asset based on the request to retrieve the portion of the stream-enabled asset from the remote storage, the predicted portion of the stream-enabled asset being a next portion of the stream-enabled asset with a probability of being requested higher than a threshold probability.

6. The method of claim 1, further comprising:
    receiving, at the asset streaming client, identification data indicating a predicted portion of the stream-enabled asset based on the request to retrieve the portion of the stream-enabled asset from the remote storage, the predicted portion of the stream-enabled asset being a next portion of the stream-enabled asset with a probability of being requested higher than a threshold probability;
    determining, using the instance of the asset streaming client, whether the predicted portion of the stream-enabled asset is stored in the local storage on the asset streaming client or in the remote storage from the asset streaming client;
    if it is determined that the predicted portion of the stream-enabled asset is stored in the local storage, retrieving the predicted portion of the stream-enabled asset from the local storage on the asset streaming client;
    if it is determined that the portion of the stream-enabled asset is stored in the remote storage:
        sending a request to retrieve the predicted portion of the stream-enabled asset from the remote storage;
        receiving, at the asset streaming client, the predicted portion of the stream-enabled asset from the remote storage in response to the request to retrieve the portion of the stream-enabled asset;
    providing the predicted portion of the stream-enabled asset for exploiting the stream-enabled asset at the streaming client.

7. The method of claim 1, further comprising:
    receiving, at the asset streaming client, identification data indicating a predicted portion of the stream-enabled asset based on the request to retrieve the portion of the stream-enabled asset from the remote storage, the predicted portion of the stream-enabled asset being a next portion of the stream-enabled asset with a probability of being requested higher than a threshold probability;

determining, at the asset streaming client, whether the predicted portion of the stream-enabled asset is needed to continue exploiting the stream-enabled asset;

if it is determined that the predicted portion of the stream-enabled asset is needed to continue exploiting the stream-enabled asset, determining, using the instance of the asset streaming client, whether the predicted portion of the stream-enabled asset is stored in the local storage on the asset streaming client or in the remote storage from the asset streaming client;

if it is determined that the predicted portion of the stream-enabled asset is stored in the local storage, retrieving the predicted portion of the stream-enabled asset from the local storage on the asset streaming client;

if it is determined that the portion of the stream-enabled asset is stored in the remote storage:
sending a request to retrieve the predicted portion of the stream-enabled asset from the remote storage;
receiving, at the asset streaming client, the predicted portion of the stream-enabled asset from the remote storage in response to the request to retrieve the portion of the stream-enabled asset;

providing the predicted portion of the stream-enabled asset for exploiting the stream-enabled asset at the streaming client.

8. A system comprising:
an asset streaming system implemented as part of an asset streaming client in either an operating system abstraction layer or a lower abstraction layer beneath the operating system abstraction layer and configured to:
receive a request for a portion of a stream-enabled asset, wherein the stream-enabled asset is a stream-enabled version of an operating system;
determine, using an instance of the asset streaming client, whether the portion of the stream-enabled asset is stored in local storage on the asset streaming client or in remote storage from the asset streaming client;
an asset cache management engine configured to retrieve the portion of the stream-enabled asset from the local storage on the asset streaming client, if it is determined that the portion of the stream-enabled asset is stored in the local storage;
an asset request engine configured to, if it is determined that the portion of the stream-enabled asset is stored in the remote storage:
send a request to retrieve the portion of the stream-enabled asset from the remote storage;
receive the portion of the stream-enabled asset from the remote storage in response to the request to retrieve the portion of the stream-enabled asset.

9. The system of claim 8, wherein:
the asset streaming system is further configured to:
receive a request for a portion of another stream-enabled asset from the operating system, wherein the another stream-enabled asset is an application;
determine, using an instance of the asset streaming client, whether the portion of the another stream-enabled asset is stored in the local storage on the asset streaming client or in the remote storage from the asset streaming client;
the asset cache management engine further configured to retrieve the portion of the another stream-enabled asset from the local storage on the asset streaming client, if it is determined that the portion of the another stream-enabled asset is stored in the local storage;
the asset request engine further configured to:
send a request to retrieve the portion of the another stream-enabled asset from the remote storage, if it is determined that the portion of the another stream-enabled asset is stored in the remote storage;
receive, at the asset streaming client, the portion of the another stream-enabled asset from the remote storage in response to the request to retrieve the portion of the another stream-enabled asset.

10. The system of claim 8, wherein the request for the portion of the stream-enabled asset is received from a hypervisor implemented, at least in part, in the lower abstraction layer beneath the operating system abstraction layer.

11. The system of claim 8, wherein the asset streaming system is further configured to:
receive an access control token of the stream-enabled asset;
update the instance of the asset streaming client to reflect that the asset streaming client has a right to exploit the stream-enabled asset.

12. The system of claim 8, wherein the asset streaming system is further configured to receive a predicted portion of the stream-enabled asset based on the request to retrieve the portion of the stream-enabled asset from the remote storage, the predicted portion of the stream-enabled asset being a next portion of the stream-enabled asset with a probability of being requested higher than a threshold probability.

13. The system of claim 8, wherein:
the asset streaming system is further configured to:
receive identification data indicating a predicted portion of the stream-enabled asset based on the request to retrieve the portion of the stream-enabled asset from the remote storage, the predicted portion of the stream-enabled asset being a next portion of the stream-enabled asset with a probability of being requested higher than a threshold probability;
determine, using the instance of the asset streaming client, whether the predicted portion of the stream-enabled asset is stored in the local storage on the asset streaming client or in the remote storage from the asset streaming client;
providing the predicted portion of the stream-enabled asset for exploiting the stream-enabled asset at the streaming client;
the asset cache management engine is further configured to, if it is determined that the predicted portion of the stream-enabled asset is stored in the local storage, retrieve the predicted portion of the stream-enabled asset from the local storage on the asset streaming client;
the asset request engine is further configured to, if it is determined that the portion of the stream-enabled asset is stored in the remote storage:
send a request to retrieve the predicted portion of the stream-enabled asset from the remote storage;
receive the predicted portion of the stream-enabled asset from the remote storage in response to the request to retrieve the portion of the stream-enabled asset.

14. The system of claim 8, wherein:
the asset streaming system is further configured to:
receive identification data indicating a predicted portion of the stream-enabled asset based on the request to retrieve the portion of the stream-enabled asset from the remote storage, the predicted portion of the stream-enabled asset being a next portion of the stream-enabled asset with a probability of being requested higher than a threshold probability;

determine whether the predicted portion of the stream-enabled asset is needed to continue exploiting the stream-enabled asset;

determine, using the instance of the asset streaming client, whether the predicted portion of the stream-enabled asset is stored in the local storage on the asset streaming client or in the remote storage from the asset streaming client, if it is determined that the predicted portion of the stream-enabled asset is needed to continue exploiting the stream-enabled asset;

providing the predicted portion of the stream-enabled asset for exploiting the stream-enabled asset at the streaming client;

the asset cache management engine is further configured to, if it is determined that the predicted portion of the stream-enabled asset is stored in the local storage, retrieve the predicted portion of the stream-enabled asset from the local storage on the asset streaming client;

the asset request engine is further configured to, if it is determined that the portion of the stream-enabled asset is stored in the remote storage:

send a request to retrieve the predicted portion of the stream-enabled asset from the remote storage;

receive the predicted portion of the stream-enabled asset from the remote storage in response to the request to retrieve the portion of the stream-enabled asset.

* * * * *